UNITED STATES PATENT OFFICE.

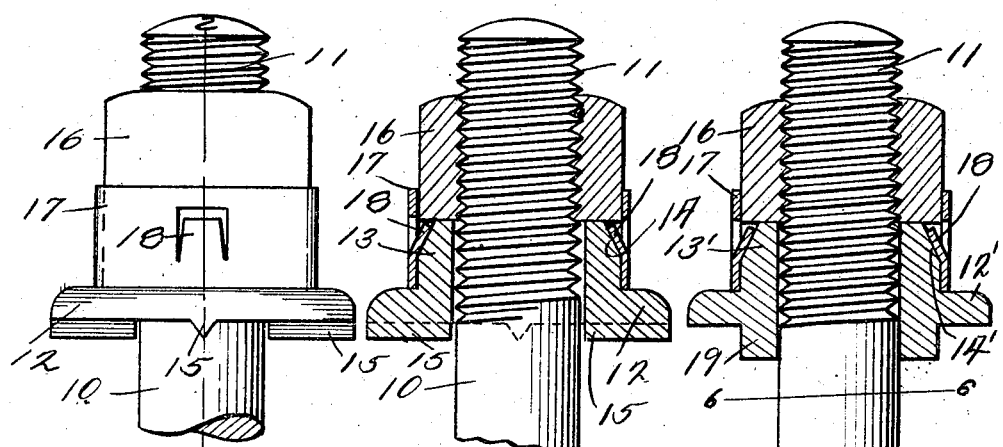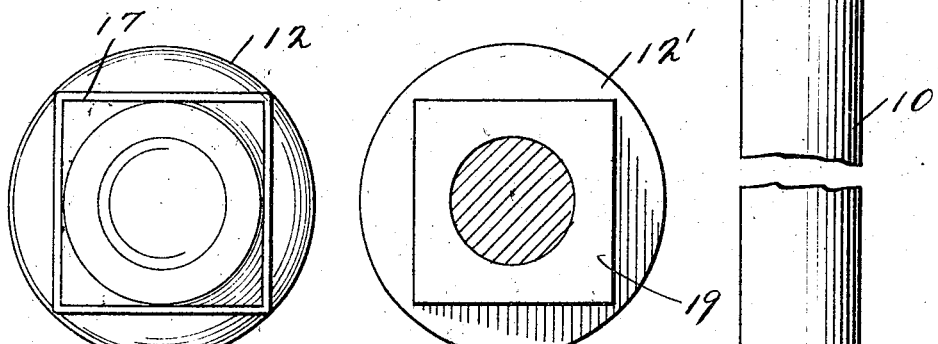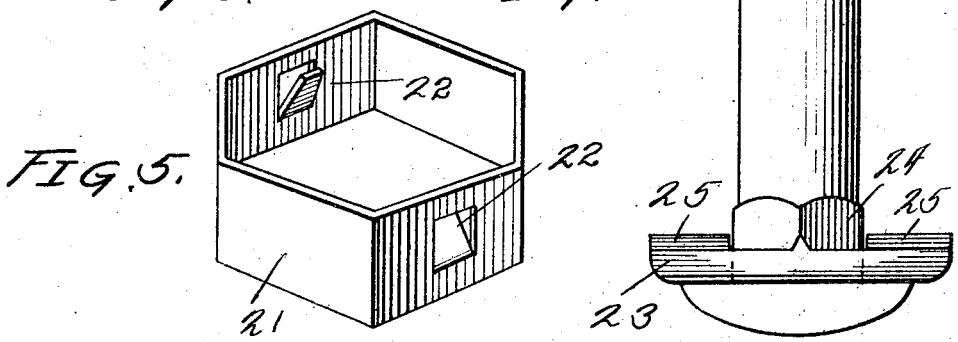

GEORGE W. DAVIS, OF GIBSON CITY, ILLINOIS, ASSIGNOR OF ONE-HALF TO CHARLES A. HELMICK, OF GIBSON CITY, ILLINOIS.

NUT-LOCK.

1,201,444.   Specification of Letters Patent.   Patented Oct. 17, 1916.

Application filed February 17, 1916. Serial No. 78,975.

*To all whom it may concern:*

Be it known that I, GEORGE W. DAVIS, a citizen of the United States, residing at Gibson City, in the county of Ford, State of Illinois, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks.

One object of the invention is to provide a novel and improved device for preventing rotation of the nut in either direction on the bolt.

Another object is to provide a device of this character which not only locks the nut against rotation but locks the bolt also.

Other objects and advantages will be apparent from the following description when taken in connection with the accompanying drawing.

In the drawing: Figure 1 is an elevation of one form of my improved nut lock; Fig. 2 is a vertical section on the line 2—2 of Fig. 1; Fig. 3 is a view looking toward the end of the bolt; Fig. 4 is a vertical sectional view of a nut and bolt, showing a modified form of washer; Fig. 5 is a perspective view of the locking sleeve used in connection with a hexagonal nut; Fig. 6 is a transverse sectional view on the line 6—6 of Fig. 4.

Referring particularly to the accompanying drawing, 10 represents a bolt provided with the usual threaded portion 11, the stem of the bolt being smooth and round in cross section, as clearly shown. Engaged on the bolt is a washer plate 12, from one face of which extends a square flange 13, and formed in the peripheral face, and adjacent the end thereof are the inwardly and upwardly inclined notches or recesses 14. From the opposite face of the washer extend the sharpened lugs or tangs 15 for biting engagement with a wooden surface in which the bolt is used. Engaged on the threaded portion of the bolt, and screwed down until its inner face rests on the outer edge face of the flange 13 is a nut 16, said nut being provided with peripheral faces of the same length as the corresponding faces of the flange 13. A metal sleeve 17 of a size and shape to snugly fit the nut and flange 13 is passed over the nut and flange until it rests against the washer 12. In each of the faces of the sleeve is a tongue 18, which, after the sleeve has been properly positioned, is pressed into one of the recesses 14. The free end of the tongue thus bears against the adjacent or bottom face of the nut 16 and effectively prevents removal of the sleeve. The sleeve being of a size and shape to snugly receive the nut and the flange, effectively prevents relative rotation of the nut and washer, and by reason of the biting engagement of the tangs 15 in the wooden work, the nut is not permitted to turn independently of the washer. When the bolt is used in connection with metal work, the face of the washer which bears against the work is formed with a squared flange 19 which is engaged in a similarly formed opening in the work, as for instance, the fish-plate of a rail joint.

The bolt used in connection with metal-work, such as structural iron work, or in railway rail joints, is shown in Figs. 4 and 6. This washer, is represented by the reference character 12′ and is formed with the flange 13′ having the recess 14′ and with the square flange 20 as above-mentioned.

When using hexagonal nuts, the washer has its flange 13 provided with the same number of peripheral faces as the nut, and in this instance a sleeve such as 21 is used, this sleeve having the tongues 22 struck from its faces in a manner similar to the other form and for the same purpose.

A washer 23 having a square opening is used in connection with a bolt having a squared shank portion 24 adjacent its head. This washer is formed with the teeth or tangs 25, as seen in Fig. 6.

What is claimed is:

A nut lock comprising a bolt having a nut engaged thereon, a washer engaged on the bolt inwardly of the nut and formed with a flange of a size and shape similar to the nut, the sides of the flange being formed with depressions, a sleeve disposed in embracing relation with both the nut and flange, and
5 tongues struck from the sleeve engaging in the depressions and beneath the inner face of the nut.

In testimony whereof, I affix my signature, in the presence of two witnesses.

GEORGE W. DAVIS.

Witnesses:
M. C. MATTINSON,
L. E. ROCKWOOD.